(12) United States Patent
Rong et al.

(10) Patent No.: US 11,699,235 B2
(45) Date of Patent: *Jul. 11, 2023

(54) WAY TO GENERATE TIGHT 2D BOUNDING BOXES FOR AUTONOMOUS DRIVING LABELING

(71) Applicant: Baidu USA LLC, Sunnyvale, CA (US)

(72) Inventors: Guodong Rong, Sunnyvale, CA (US); Peitao Zhao, Sunnyvale, CA (US); Jaewon Jung, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 39 days.

This patent is subject to a terminal disclaimer.

(21) Appl. No.: 16/689,982

(22) Filed: Nov. 20, 2019

(65) Prior Publication Data
US 2021/0150226 A1 May 20, 2021

(51) Int. Cl.
*G06V 20/58* (2022.01)
*G06T 7/11* (2017.01)
(Continued)

(52) U.S. Cl.
CPC .............. *G06T 7/11* (2017.01); *G06F 18/214* (2023.01); *G06T 7/90* (2017.01); *G06V 20/58* (2022.01);
(Continued)

(58) Field of Classification Search
CPC ..... G06T 7/11; G06T 7/10; G06T 7/12; G06T 7/90; G06T 2207/10024;
(Continued)

(56) References Cited

U.S. PATENT DOCUMENTS 10,460,180 B2 * 10/2019 Gao .................. G06K 9/627
2010/0322489 A1 * 12/2010 Tizhoosh .............. G06K 9/6253
382/128

(Continued)

OTHER PUBLICATIONS

S. Song and J. Xiao, "Deep Sliding Shapes for Amodal 3D Object Detection in RGB-D Images," 2016 IEEE Conference on Computer Vision and Pattern Recognition (CVPR), Las Vegas, NV, USA, 2016, pp. 808-816, doi: 10.1109/CVPR.2016.94. (Year: 2016).*

(Continued)

*Primary Examiner* — Sean M Conner
*Assistant Examiner* — Stephen M Brinich
(74) *Attorney, Agent, or Firm* — Womble Bond Dickinson (US) LLP

(57) ABSTRACT

A method, apparatus, and system for generating tight two-dimensional (2D) bounding boxes for visible objects in a three-dimensional (3D) scene is disclosed. A two-dimensional (2D) segmentation image of a three-dimensional (3D) scene comprising one or more objects is generated by rendering the 3D scene with a segmentation camera. Each of the objects is rendered in a single respective different color. Next, one or more visible objects in the 3D scene are identified among the one or more objects based on the segmentation image. Next, a 2D amodal segmentation image for each of the visible objects in the 3D scene is generated separately. Each amodal segmentation image comprises only the single visible object for which it is generated. Thereafter, a 2D bounding box is generated for each of the visible objects in the 3D scene based on the amodal segmentation image for the visible object.

17 Claims, 12 Drawing Sheets

(51) Int. Cl.
*G06K 9/62* (2022.01)
*G06T 7/90* (2017.01)
*G06F 18/214* (2023.01)

(52) U.S. Cl.
CPC .............. *G06T 2207/10024* (2013.01); *G06T 2207/20081* (2013.01); *G06T 2207/30261* (2013.01)

(58) Field of Classification Search
CPC . G06T 2207/20081; G06T 2207/20084; G06T 2207/30261; G06T 2207/30248
USPC ....... 382/100, 103–104, 164, 171, 173, 195, 382/205
See application file for complete search history.

(56) References Cited

U.S. PATENT DOCUMENTS

| | | | |
|---|---|---|---|
| 2012/0069007 A1* | 3/2012 | Pegg | H04N 13/128 345/419 |
| 2018/0158197 A1* | 6/2018 | Dasgupta | G06K 9/726 |
| 2018/0330615 A1* | 11/2018 | Yamanaka | G08G 1/16 |
| 2019/0147245 A1* | 5/2019 | Qi | G06K 9/3233 382/103 |
| 2019/0248487 A1* | 8/2019 | Holtz | G06K 9/00201 |
| 2020/0401835 A1* | 12/2020 | Zhao | G06N 3/084 |

OTHER PUBLICATIONS

K. Ehsani, R. Mottaghi and A. Farhadi, "SeGAN: Segmenting and Generating the Invisible," in 2018 IEEE/CVF Conference on Computer Vision and Pattern Recognition (CVPR), Salt Lake City, UT, USA, 2018 pp. 6144-6153. doi: 10.1109/CVPR.2018.00643 (Year: 2018).*

Yuting Xiao, Yanyu Xu, Ziming Zhong, Weixin Luo, Jiawei Li, Shenghua Gao, "Amodal Segmentation Based on Visible Region Segmentation and Shape Prior" Shanghai Engineering Research Center of Intelligent Vision and Imaging Alibaba Group Dec. 19, 2020 (Year: 2020).*

Luo Zekun et al: "Real-time Object Detection Based on RGB-D Image", 2019 IEEE International Conference on Computational Electromagnetics (ICCEM), IEEE, Mar. 20, 2019 (Mar. 20, 2019), pp. 1-3, XP033584205, DOI: 10.1109/COMPEM.2019.8779089 [retrieved on Jul. 26, 2019] p. 1-p. 2.

Qi Lu et al: "Amodal Instance Segmentation With KINS Dataset", 2019 IEEE/CVF Conference on Computer Vision and Pattern Recognition (CVPR), IEEE, Jun. 15, 2019 (Jun. 15, 2019), pp. 3009-3018, XP033687450, DOI: 10.1109/CVPR.2019.00313 [retrieved on Jan. 8, 2020].

Alexey Dosovitskiy et al: "CARLA: An Open Urban Driving Simulator", Arxiv.org, Cornell University Library, 201 Olin Library Cornell University Ithaca, NY 14853, Nov. 10, 2017 (Nov. 10, 2017), XP081287280, Figure 2.

* cited by examiner

WAY TO GENERATE TIGHT 2D BOUNDING BOXES FOR AUTONOMOUS DRIVING LABELING

TECHNICAL FIELD

Embodiments of the present disclosure relate generally to operating autonomous vehicles. More particularly, embodiments of the disclosure relate to generating data for training the perception module for autonomous driving.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed, without considering the differences in features for different types of vehicles. Same motion planning and control is applied to all types of vehicles, which may not be accurate and smooth under some circumstances.

The perception module is the key component in the stack of autonomous driving. Artificial Intelligence (AI) algorithms used in the perception module require a large amount of labeled images for training. Manual labeling is both time-consuming and costly, and can be inaccurate. Accordingly, synthetic data is sometimes used in the art to generate labeled data to help the perception module achieve better results.

Ideally, in a labeled image, each obstacle relevant to autonomous driving is labeled with a tight two-dimensional (2D) bounding box. In existing synthetic datasets usable for autonomous driving, some (e.g., Playing for Data, SYNTHIA) provide no 2D bounding boxes, while some others (e.g., Ford Center for Autonomous Vehicles "FCAV," Playing for Benchmarks) have 2D bounding boxes only for visible pixels (as opposed to 2D bounding boxes for all, including occluded or truncated, pixels of visible objects), and still some others (e.g., Virtual KITTI) provide 2D bounding boxes bigger than the objects themselves that are generated based on three-dimensional (3D) bounding boxes. To obtain the best training result, the perception module requires a tight 2D bounding box which at the same time covers both visible and occluded or truncated parts of an object.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
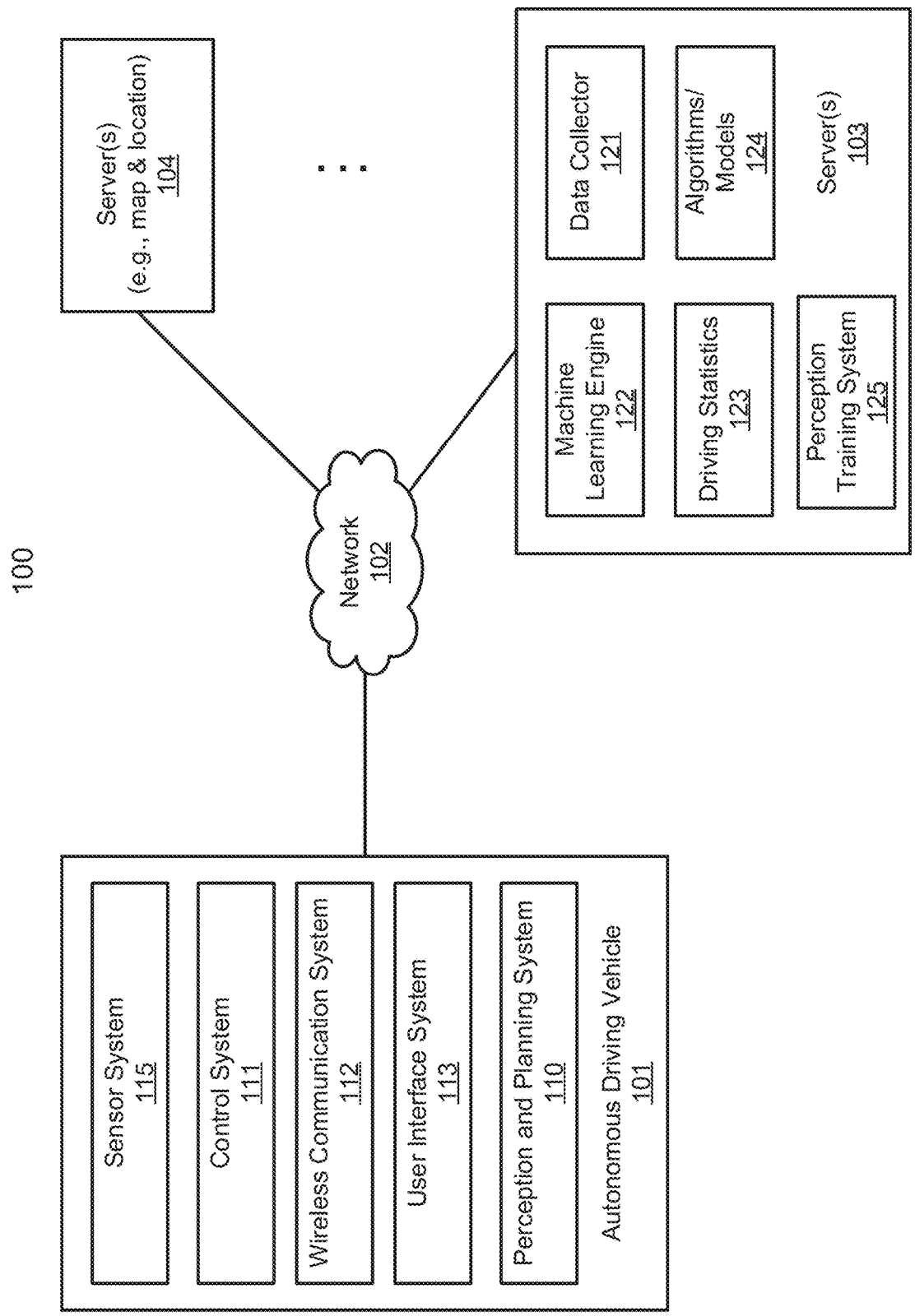
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Some embodiments relate to a method, apparatus, and system for generating tight two-dimensional (2D) bounding boxes for visible objects in a three-dimensional (3D) scene. First, a two-dimensional (2D) segmentation image of a three-dimensional (3D) scene comprising one or more objects is generated by rendering the 3D scene with a segmentation camera. Each of the objects is rendered in a single respective different color. Next, one or more visible objects in the 3D scene are identified among the one or more objects based on the segmentation image. Next, a 2D amodal segmentation image for each of the visible objects in the 3D scene is generated separately. Each amodal segmentation image comprises only the single visible object for which it is generated, and the whole visible object is rendered in its entirety without occlusion in the respective amodal segmentation image, even if it would be partially occluded by another object in the scene when rendered with a conventional sensor camera. Thereafter, a 2D bounding box is generated for each of the visible objects in the 3D scene based on the amodal segmentation image for the visible object.

The dataset including the generated 2D bounding boxes may be used to train the perception module of the autonomous vehicle.

In one embodiment, to identify the one or more visible objects in the 3D scene based on the segmentation image, a quantity of visible pixels for each of the objects in the 3D scene is determined. It should be appreciated that all pixels present in the segmentation image associated with an object are visible pixels, and that a correspondence between a pixel and its associated object can be identified based on a color of the pixel and the single color of the associated object. Next, for each of the objects, whether a quantity of visible pixels associated with the object is greater than a predetermined threshold is determined. Thereafter, an object in the 3D scene is identified as a visible object if the quantity of visible pixels associated with the object is greater than the predetermined threshold.

In one embodiment, to generate the 2D bounding box for each of the visible objects in the 3D scene based on the amodal segmentation image for the visible object, a minimum x-coordinate, a minimum y-coordinate, a maximum x-coordinate, and a maximum y-coordinate associated with pixels of the visible object are determined based on the amodal segmentation image. Then, a rectangle associated with the minimum x-coordinate, the minimum y-coordinate, the maximum x-coordinate, and the maximum y-coordinate is generated as the 2D bounding box for the visible object.

In one embodiment, each amodal segmentation image associated with a single visible object is generated with a 1-bit (per pixel) color depth. Accordingly, a plurality of amodal segmentation images can be rendered into a single color-format image in a single render pass, where each color information bit in the color-format image corresponds to a respective visible object. For example, in one embodiment, 32 amodal segmentation images associated with 32 visible objects are rendered into a single 32-bit (per pixel)-color-format image (e.g., a red green blue alpha "RGBA" image) in a single render pass.

In one embodiment, with a multiple render target (MRT) technique, even more amodal segmentation images can be rendered in a single render pass. In particular, a first plurality of amodal segmentation images may be rendered into a second plurality of color-format images in a single render pass, where each color information bit in each of the color-format images corresponds to a respective visible object. For example, in one embodiment, 128 amodal segmentation images associated with 128 visible objects are rendered into four 32-bit (per pixel)-color-format images (e.g., RGBA images) in a single render pass.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
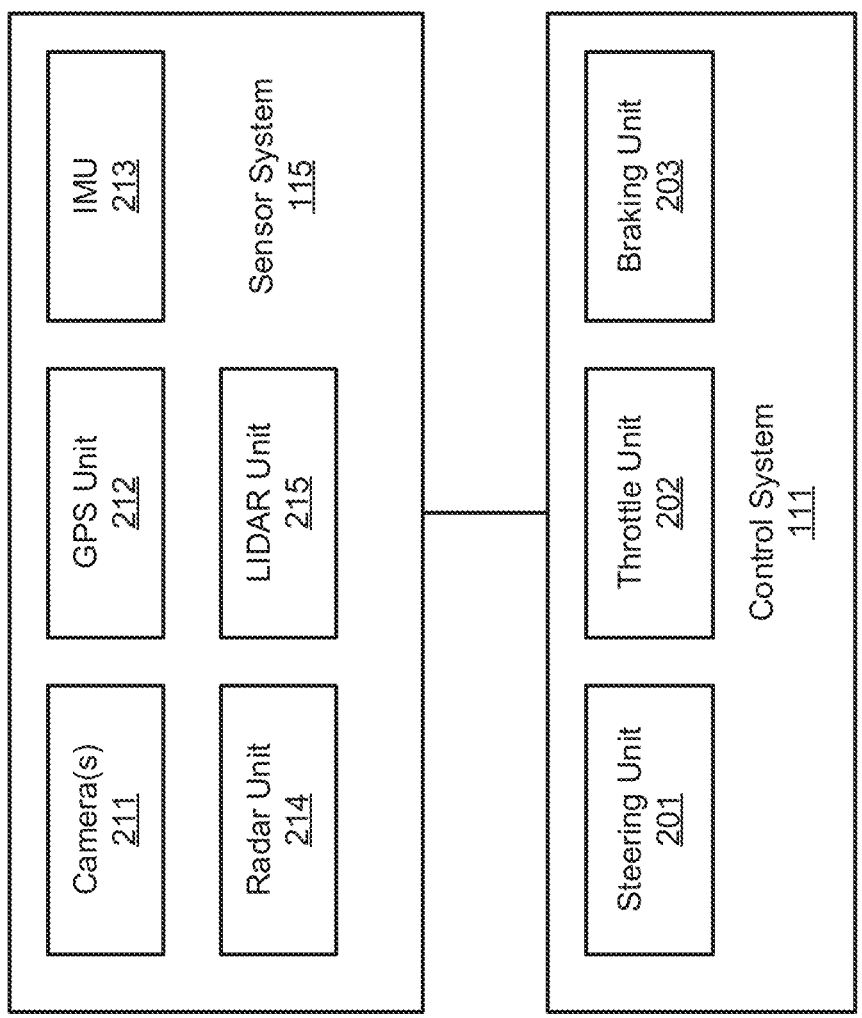
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In particular, for example, the machine learning engine 122 may help improve the perception and planning of the ADV by generating or training models based on synthetic data according to embodiments of the disclosure. Perception training system or module 125 is configured to train a perception module or model to perform perception of obstacles based on the images captured by sensors. Algorithms/models 124 can then be uploaded on ADVs to be utilized during autonomous driving in real-time.

Figure 3A:
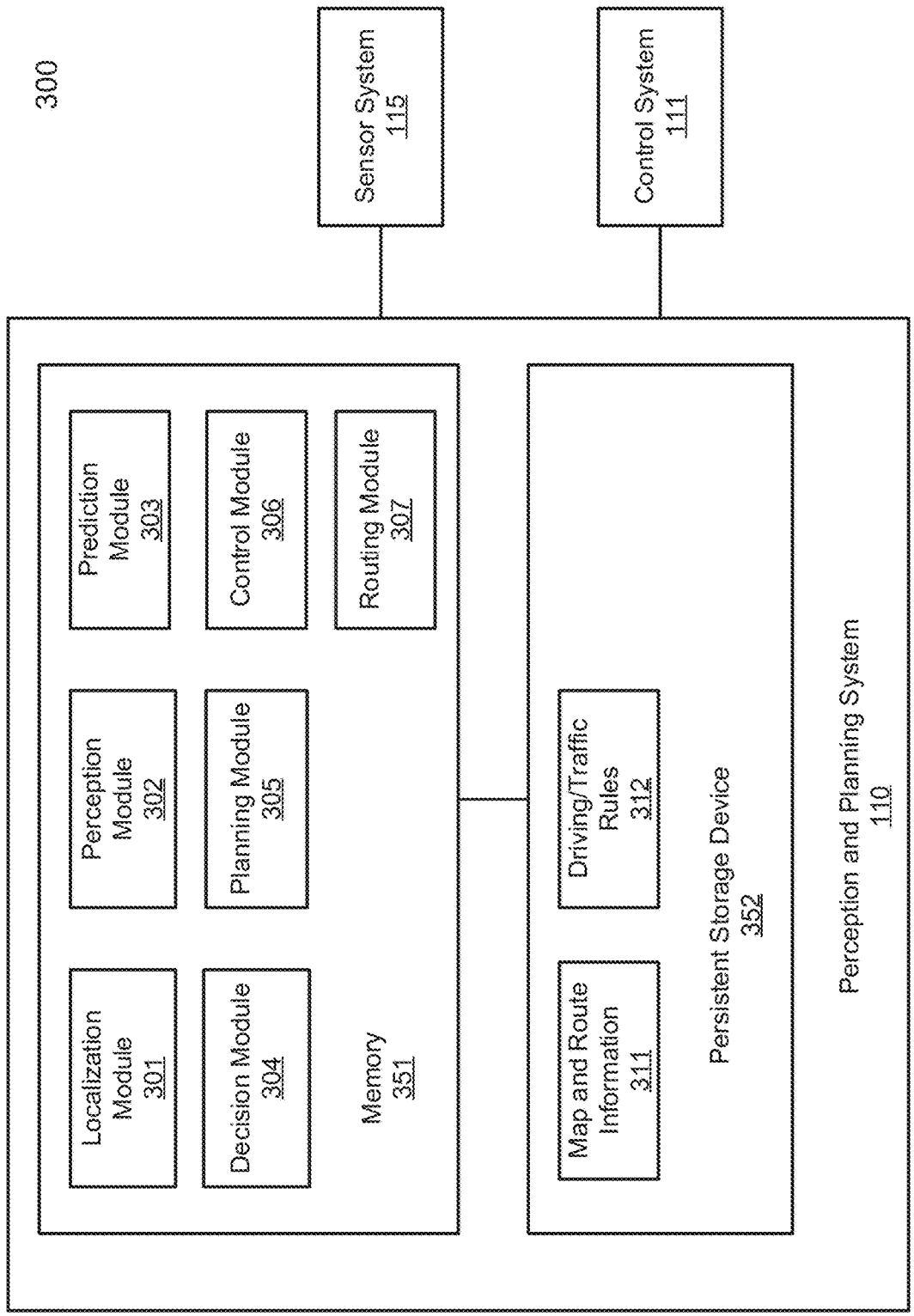
FIGS. 3A-3B are block diagrams illustrating an example of a perception and planning system used with an autonomous vehicle according to one embodiment.
Figure 3B:
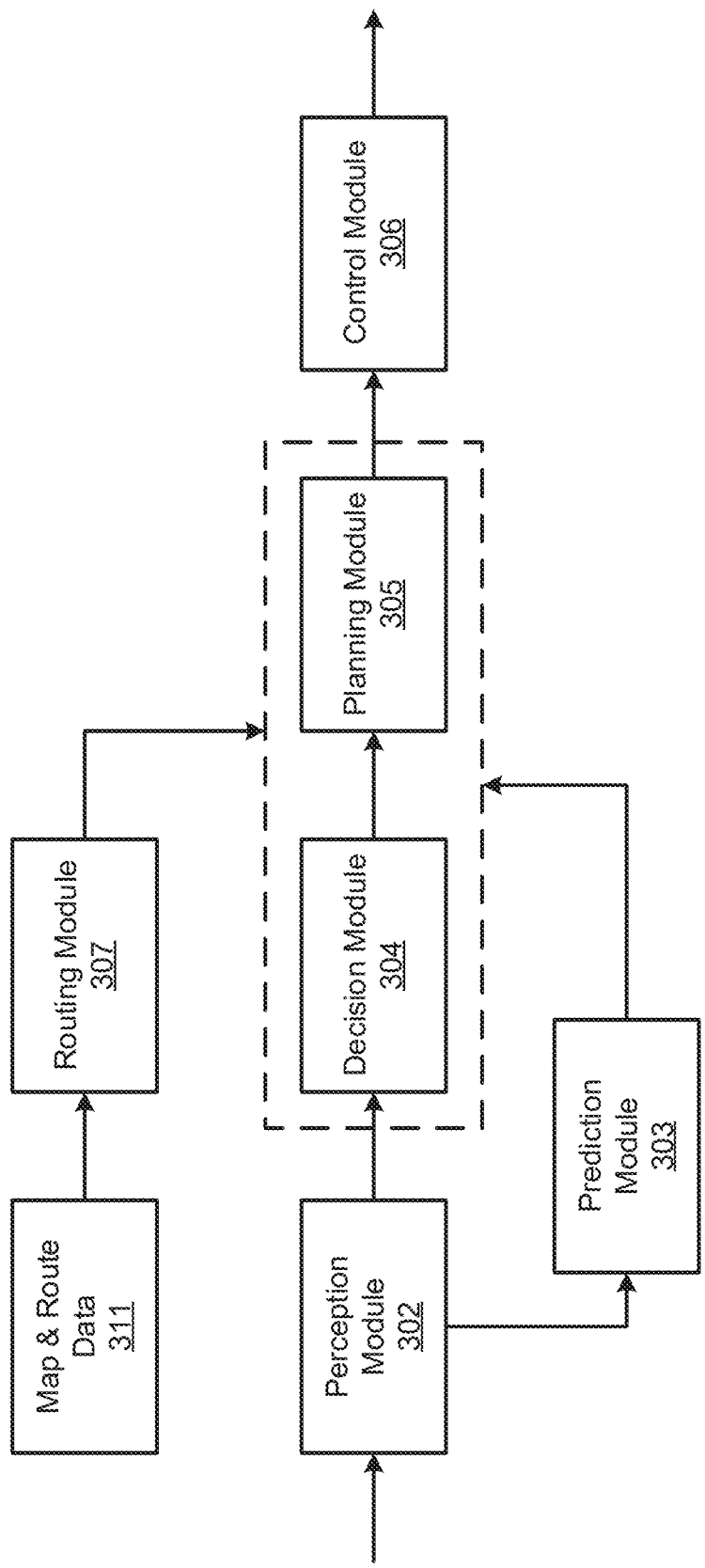

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Figure 4:
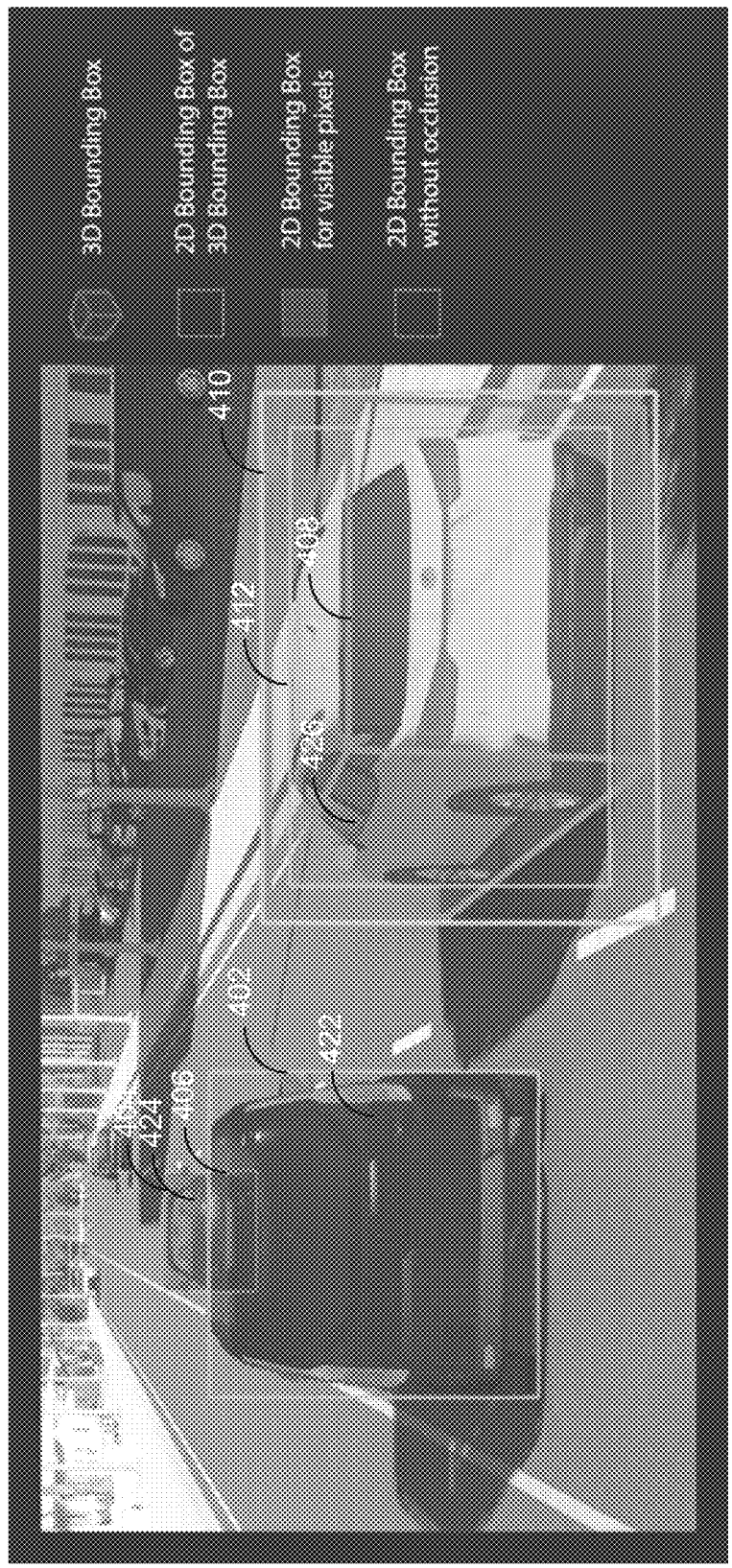
FIG. 4 is a diagram illustrating various types of bounding boxes described herein.
Figure 8:
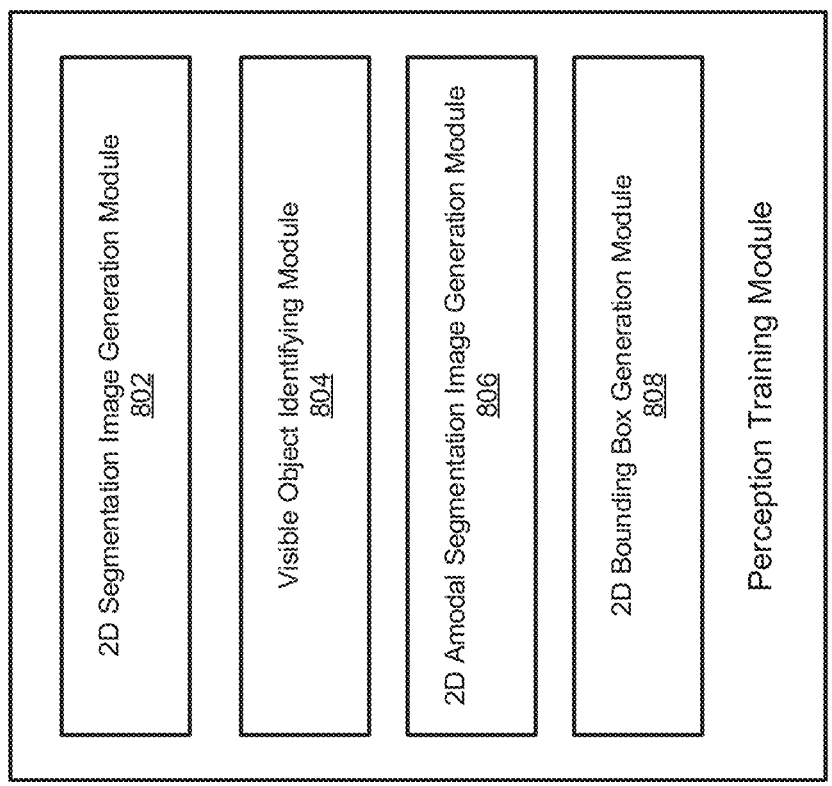
FIG. 8 is a block diagram illustrating an example apparatus according to one embodiment.

FIG. 4 shows a process of training a perception module according to one embodiment. The process can be performed by a perception training module as shown in FIG. 8, which will be described in details further below. Referring to FIG. 4, a diagram 400 illustrating various types of bounding boxes described herein is shown. A bounding box 402 that encloses the vehicle 422 directly ahead is a tight 2D bounding box. As the vehicle 424 further ahead is partially occluded by the vehicle 422 in the scene, a 2D bounding box 404 enclosing only the visible portion of the vehicle 424 is a 2D bounding box for only the visible pixels (such a bounding box 404 may be referred to as a bounding box with occlusion). An additional 2D bounding box 406 enclosing all of the vehicle 424 including the occluded part is also shown. The bounding box 406 and others like it may be referred to as bounding boxes without occlusion. A 3D bounding box 408 enclosing the vehicle 426 to the right is generated based on the 3D model of the vehicle 426 (i.e., the 3D bounding box 408 corresponds to minimum and maximum x-, y-, and z-coordinates associated with the 3D model of the vehicle 426). A non-tight 2D bounding box 410 can be generated based on the 3D bounding box 408 by projecting the 3D bounding box 408 to the image plane and generating a 2D bounding box 410 based on the projected 3D bounding box 408. It should be appreciated that the non-tight 2D bounding box 410 and others like it are not ideal for the purpose of training the perception module for autonomous driving. Finally, a tight 2D bounding box 412 enclosing the vehicle 426 is also shown. Tight 2D bounding boxes without occlusion, such as bounding boxes 402, 406, and 412 are the most useful for training the perception module. Thus, various embodiments of the disclosure are directed to generating tight 2D bounding boxes.

Figure 5:
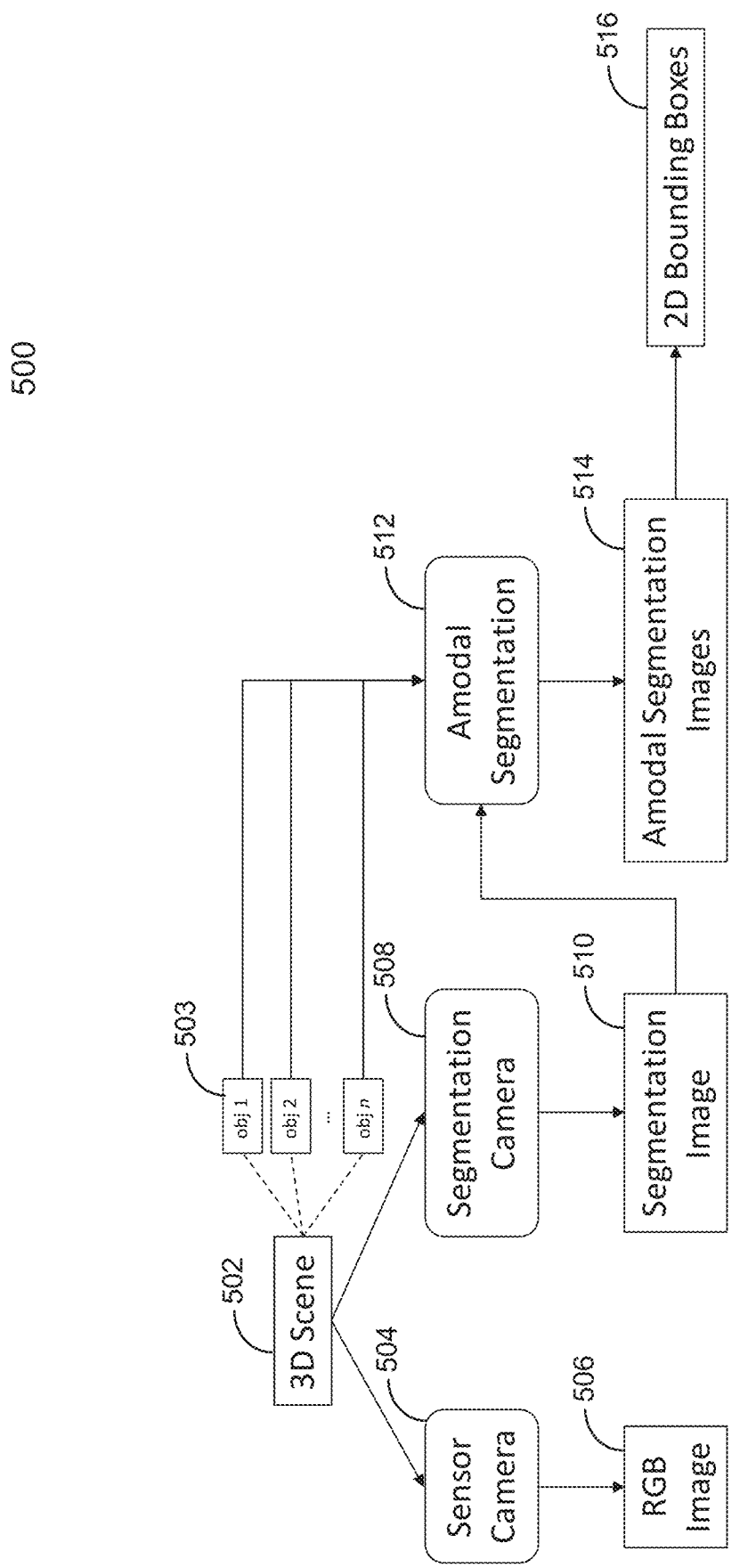
FIG. 5 is a block diagram illustrating various components utilized according to embodiments of the disclosure.
Figure 6A:
FIGS. 6A-D are images generated for and illustrative of embodiments of the disclosure.
Figure 6B:

Referring to FIG. 5, a block diagram 500 illustrating various components utilized according to embodiments of the disclosure is shown. Referring further to FIGS. 6A-D, images 506, 510, 514, 600D generated for and illustrative of embodiments of the disclosure are shown. FIG. 6A illustrates a conventional RGB image 506 generated by rendering a three-dimensional (3D) scene 502 using a conventional sensor camera 504. A number of objects (obstacles) 503 in the 3D scene 502 are of interest to autonomous driving, such as pedestrians, automobiles, motorcycles, motorcyclists, bicycles, and bicycles, etc. FIG. 6B illustrates a two-dimensional (2D) segmentation image 510. The two-dimensional (2D) segmentation image 510 of the three-dimensional (3D) scene 502 comprising one or more objects 503 is generated by rendering the 3D scene 502 with a segmentation camera 508. As shown in FIG. 6B, each of the objects 503 is rendered in a single respective different color. Next, one or more visible objects in the 3D scene 502 are identified among the one or more objects 503 based on the segmentation image 510. It should be appreciated that hereinafter a "camera" in a 3D rendering context refers to a process that simulates visual phenomena resulting from optical characteristics of cameras. Some of the simulated special cameras described herein (e.g., the segmentation camera 508, the amodal segmentation camera) have imaginary properties and do not have real world counterparts.

In one embodiment, to identify the one or more visible objects in the 3D scene 502 based on the segmentation image 510, a quantity of visible pixels for each of the objects 503 in the 3D scene 502 is determined. It should be appreciated that all pixels present in the segmentation image 510 associated with an object 503 are visible pixels, and that a correspondence between a pixel and its associated object 503 can be identified based on a color of the pixel and the single color of the associated object. Next, for each of the objects 503, whether a quantity of visible pixels associated with the object 503 is greater than (in a different embodiment, the relationship may be "equal to or greater than") a predetermined threshold is determined. Thereafter, an object 503 in the 3D scene 502 is identified as a visible object if the quantity of visible pixels associated with the object 503 is greater than (in a different embodiment, the relationship may be "equal to or greater than") the predetermined threshold.

Figure 6C:
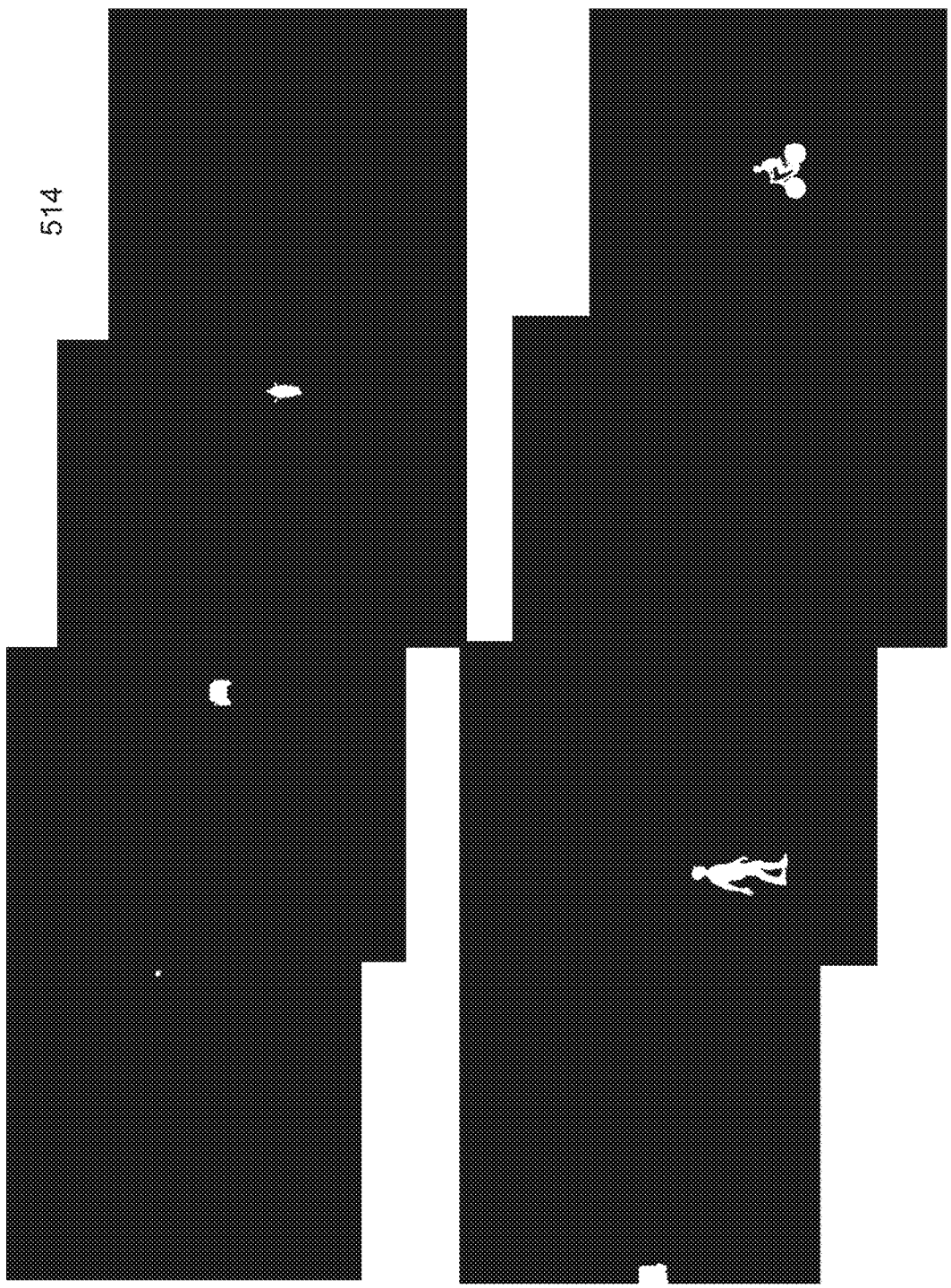

Next, a 2D amodal segmentation image 514 for each of the visible objects in the 3D scene is generated separately. Each amodal segmentation image 512 comprises only the single visible object for which it is generated. An amodal segmentation image 514 is generated by rendering the respective object with an amodal segmentation camera 512. FIG. 6C illustrates the amodal segmentation images 514 for several objects. Thereafter, a 2D bounding box 516 is generated for each of the visible objects in the 3D scene 502 based on the amodal segmentation image 514 for the visible object.

Figure 6D:

In one embodiment, to generate the 2D bounding box 516 for each of the visible objects in the 3D scene based on the amodal segmentation image 514 for the visible object, a minimum x-coordinate, a minimum y-coordinate, a maximum x-coordinate, and a maximum y-coordinate associated with pixels of the visible object are determined based on the amodal segmentation image 514. Then, a rectangle associated with the minimum x-coordinate, the minimum y-coordinate, the maximum x-coordinate, and the maximum y-coordinate is generated as the 2D bounding box 516 for the visible object. FIG. 6D illustrates the result image 600D generated by superimposing bounding boxes 516 for the visible objects on the RGB image 506.

As only the pixel coordinates are useful in an amodal segmentation image 514, in one embodiment, each amodal segmentation image 514 associated with a single visible object is generated with a 1-bit (per pixel) color depth (as is shown in FIG. 6C). Accordingly, a plurality of amodal segmentation images 514 can be rendered into a single color-format image in a single render pass, where each color information bit in the color-format image corresponds to a respective visible object. This is useful as the commonplace red green blue alpha (RGBA) texture has 32 color information bits per pixel (8 bits per channel). Therefore, for example, in one embodiment, 32 amodal segmentation images associated with 32 visible objects are rendered into a single 32-bit (per pixel)-color-format image (e.g., an RGBA image) in a single render pass. For example, at a particular pixel in the 32-bit-color-format image, if two objects whose amodal segmentation image information occupies respectively the 6th and 7th least significant bits in the color information are present, the resulting color value for the pixel is 1100000 in binary (96 in decimal), which is the result of bitwise OR of 1000000 in binary (64 in decimal) and 100000 in binary (32 in decimal).

In one embodiment, with a multiple render target (MRT) technique, even more amodal segmentation images can be renered in a single render pass. In particular, a first plurality of amodal segmentation images may be rendered into a second plurality of color-format images in a single render pass, where each color information bit in each of the color-format images corresponds to a respective visible object. For example, in one embodiment, 128 amodal segmentation images associated with 128 visible objects are rendered into four 32-bit (per pixel)-color-format images (e.g., RGBA images) in a single render pass.

Figure 7:
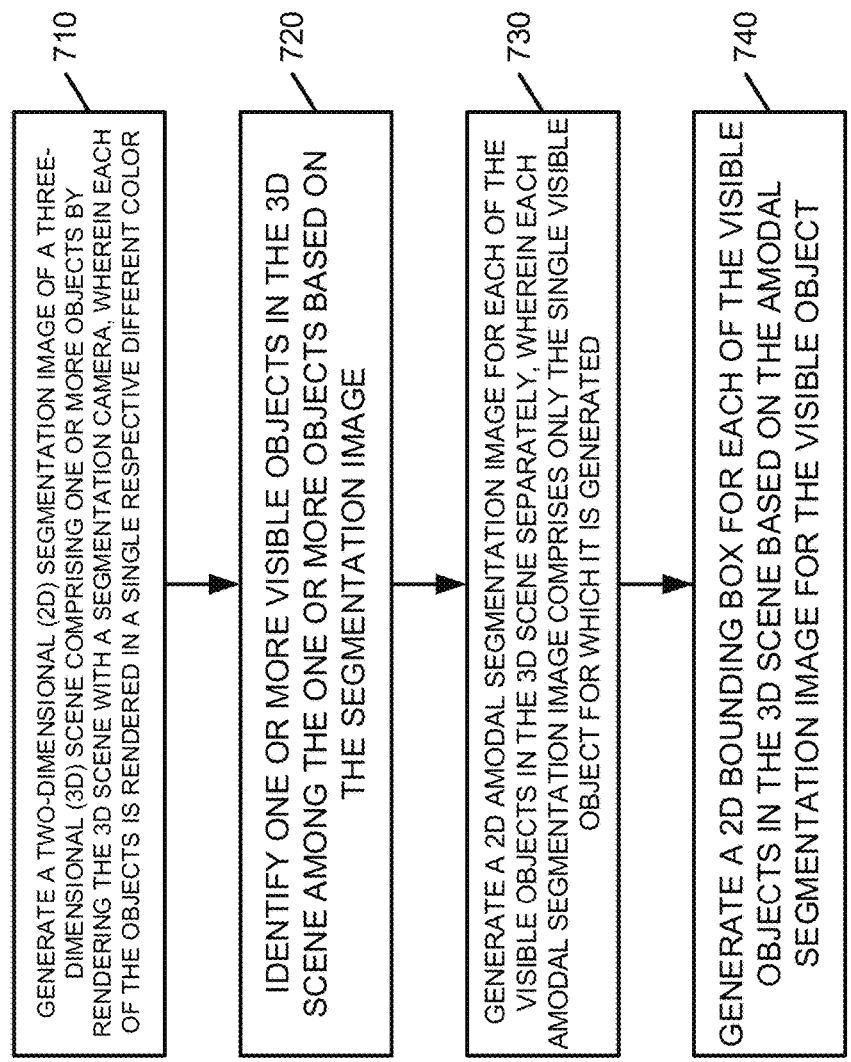
FIG. 7 is a flowchart illustrating an example method for generating tight two-dimensional (2D) bounding boxes for visible objects in a three-dimensional (3D) scene according to one embodiment.

Referring to FIG. 7, a flowchart illustrating an example method 700 for generating tight two-dimensional (2D) bounding boxes for visible objects in a three-dimensional (3D) scene according to one embodiment is shown. The process 700 can be implemented in hardware, software, or a combination thereof. At block 710, a two-dimensional (2D) segmentation image of a three-dimensional (3D) scene comprising one or more objects is generated by rendering the 3D scene with a segmentation camera. Each of the objects is rendered in a single respective different color. At block 720, one or more visible objects in the 3D scene are identified among the one or more objects based on the segmentation image. At block 730, a 2D amodal segmentation image for each of the visible objects in the 3D scene is generated separately. Each amodal segmentation image comprises only the single visible object for which it is generated. Thereafter, at block 740, a 2D bounding box is generated for each of the visible objects in the 3D scene based on the amodal segmentation image for the visible object.

FIG. 8 shows an example of a perception training module according to one embodiment. Perception training module 800 may be implemented as part of perception training system 125 of FIG. 1 for training a perception system of an autonomous driving system such as perception module 302. Referring to FIG. 8, a block diagram illustrating an example apparatus 800 according to one embodiment is shown. Various modules illustrated in FIG. 8 can be implemented in either hardware or software. A 2D segmentation image generation module 802 is configured to generate a 2D segmentation image of a 3D scene comprising one or more objects by rendering the 3D scene with a segmentation camera. Each of the objects is rendered in a single respective different color. A visible object identifying module 804 is configured to identify one or more visible objects in the 3D scene among the one or more objects based on the segmentation image. A 2D amodal segmentation image generation module 806 is configured to generate a 2D amodal segmentation image for each of the visible objects in the 3D scene separately. Each amodal segmentation image comprises only the single visible object for which it is generated. A 2D bounding box generation module 808 is configured to generate a 2D bounding box for each of the visible objects in the 3D scene based on the amodal segmentation image for the visible object.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:
1. A computer-implemented method for perceiving obstacles of autonomous driving, the method comprising:
   generating a two-dimensional (2D) segmentation image of a three-dimensional (3D) scene comprising one or more objects by rendering the 3D scene with a segmentation camera, wherein each of the one or more objects is rendered in a single respective different color;
   identifying one or more visible objects in the 3D scene among the one or more objects based on the segmentation image, further comprising:
      determining a quantity of visible pixels for each of the objects in the 3D scene, wherein all pixels present in the segmentation image associated with an object are visible pixels, and wherein a correspondence between a pixel and its associated object is identified based on a color of the pixel and a single color of the associated object;

determining, for each of the objects, whether the quantity of visible pixels associated with the object is greater than a predetermined threshold; and identifying an object in the 3D scene as a visible object in response to determining that the quantity of visible pixels associated with the object is greater than the predetermined threshold;

generating a 2D a modal segmentation image for each of the visible objects in the 3D scene separately, wherein each amodal segmentation image comprises only a single visible object for which it is generated; and generating a 2D bounding box for each of the visible objects in the 3D scene based on the amodal segmentation image for the visible object.

2. The method of claim 1, wherein generating the 2D bounding box for each of the visible objects in the 3D scene based on the amodal segmentation image for the visible object further comprises:

determining a minimum x-coordinate, a minimum y-coordinate, a maximum x-coordinate, and a maximum y-coordinate associated with pixels of the visible object based on the amodal segmentation image;

generating a rectangle associated with the minimum x-coordinate, the minimum y-coordinate, the maximum x-coordinate, and the maximum y-coordinate as the 2D bounding box for the visible object.

3. The method of claim 1, wherein each amodal segmentation image associated with a single visible object is generated with a 1-bit color depth.

4. The method of claim 3, wherein a plurality of amodal segmentation images are rendered into a single color-format image in a single render pass, and wherein each color information bit in the color-format image corresponds to a respective visible object.

5. The method of claim 4, wherein 32 amodal segmentation images associated with 32 visible objects are rendered into a single 32-bit-color-format image in the single render pass.

6. The method of claim 3, wherein a first plurality of amodal segmentation images are rendered with a multiple render target (MRT) technique into a second plurality of color-format images in a single render pass, and wherein each color information bit in each of the color-format images corresponds to a respective visible object.

7. The method of claim 6, wherein 128 amodal segmentation images associated with 128 visible objects are rendered into four 32-bit-color-format images in a single render pass.

8. A non-transitory machine-readable medium having instructions stored therein, which when executed by a processor, cause the processor to perform operations for perceiving obstacles of autonomous driving, the operations comprising:

generating a two-dimensional (2D) segmentation image of a three-dimensional (3D) scene comprising one or more objects by rendering the 3D scene with a segmentation camera, wherein each of the one or more objects is rendered in a single respective different color;

identifying one or more visible objects in the 3D scene among the one or more objects based on the segmentation image, further comprising:

determining a quantity of visible pixels for each of the objects in the 3D scene, wherein all pixels present in the segmentation image associated with an object are visible pixels, and wherein a correspondence between a pixel and its associated object is identified based on a color of the pixel and a single color of the associated object;

determining, for each of the objects, whether the quantity of visible pixels associated with the object is greater than a predetermined threshold; and identifying an object in the 3D scene as a visible object in response to determining that the quantity of visible pixels associated with the object is greater than the predetermined threshold;

generating a 2D amodal segmentation image for each of the visible objects in the 3D scene separately, wherein each amodal segmentation image comprises only a single visible object for which it is generated; and generating a 2D bounding box for each of the visible objects in the 3D scene based on the amodal segmentation image for the visible object.

9. The non-transitory machine-readable medium of claim 8, wherein generating the 2D bounding box for each of the visible objects in the 3D scene based on the amodal segmentation image for the visible object further comprises:

determining a minimum x-coordinate, a minimum y-coordinate, a maximum x-coordinate, and a maximum y-coordinate associated with pixels of the visible object based on the amodal segmentation image;

generating a rectangle associated with the minimum x-coordinate, the minimum y-coordinate, the maximum x-coordinate, and the maximum y-coordinate as the 2D bounding box for the visible object.

10. The non-transitory machine-readable medium of claim 8, wherein each amodal segmentation image associated with a single visible object is generated with a 1-bit color depth.

11. The non-transitory machine-readable medium of claim 10, wherein a plurality of amodal segmentation images are rendered into a single color-format image in a single render pass, and wherein each color information bit in the color-format image corresponds to a respective visible object.

12. The non-transitory machine-readable medium of claim 11, wherein 32 amodal segmentation images associated with 32 visible objects are rendered into a single 32-bit-color-format image in the single render pass.

13. The non-transitory machine-readable medium of claim 10, wherein a first plurality of amodal segmentation images are rendered with a multiple render target (MRT) technique into a second plurality of color-format images in a single render pass, and wherein each color information bit in each of the color-format images corresponds to a respective visible object.

14. The non-transitory machine-readable medium of claim 13, wherein 128 amodal segmentation images associated with 128 visible objects are rendered into four 32-bit-color-format images in a single render pass.

15. A data processing system, comprising:

a processor; and a memory coupled to the processor to store instructions, which when executed by the processor, cause the processor to perform operations for perceiving obstacles of autonomous driving, the operations including generating a two-dimensional (2D) segmentation image of a three-dimensional (3D) scene comprising one or more objects by rendering the 3D scene with a segmentation camera, wherein each of the one or more objects is rendered in a single respective different color, identifying one or more visible objects in the 3D scene among the one or more objects based on the segmentation image, further comprising:

determining a quantity of visible pixels for each of the objects in the 3D scene, wherein all pixels present in the segmentation image associated with an object are visible pixels, and wherein a correspondence between a pixel and its associated object is identified based on a color of the pixel and a single color of the associated object;

determining, for each of the objects, whether the quantity of visible pixels associated with the object is greater than a predetermined threshold; and identifying an object in the 3D scene as a visible object in response to determining that the quantity of visible pixels associated with the object is greater than the predetermined threshold, generating a 2D amodal segmentation image for each of the visible objects in the 3D scene separately, wherein each amodal segmentation image comprises only a single visible object for which it is generated, and generating a 2D bounding box for each of the visible objects in the 3D scene based on the amodal segmentation image for the visible object.

16. The data processing system of claim 15, wherein generating the 2D bounding box for each of the visible objects in the 3D scene based on the amodal segmentation image for the visible object further comprises:

determining a minimum x-coordinate, a minimum y-coordinate, a maximum x-coordinate, and a maximum y-coordinate associated with pixels of the visible object based on the amodal segmentation image;

generating a rectangle associated with the minimum x-coordinate, the minimum y-coordinate, the maximum x-coordinate, and the maximum y-coordinate as the 2D bounding box for the visible object.

17. The data processing system of claim 15, wherein each amodal segmentation image associated with a single visible object is generated with a 1-bit color depth.

* * * * *